(12) United States Patent
Alving et al.

(10) Patent No.: US 7,504,638 B2
(45) Date of Patent: Mar. 17, 2009

(54) DIGITAL FLAT X-RAY DETECTOR

(75) Inventors: Lex Alving, Eindhoven (NL); Dirk Willem Harberts, Eindhoven (NL); Hans Stouten, Eindhoven (NL); Stephanus Berardus Worm, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 11/912,327

(22) PCT Filed: Apr. 13, 2006

(86) PCT No.: PCT/IB2006/051161

§ 371 (c)(1),
(2), (4) Date: Oct. 24, 2007

(87) PCT Pub. No.: WO2006/114722

PCT Pub. Date: Nov. 2, 2006

(65) Prior Publication Data

US 2008/0185529 A1    Aug. 7, 2008

(30) Foreign Application Priority Data

Apr. 27, 2005  (EP)  ................... 05103413

(51) Int. Cl.
*G01T 1/24* (2006.01)

(52) U.S. Cl. ................................. 250/370.09

(58) Field of Classification Search ................
250/370.01–370.15
See application file for complete search history.

(56) References Cited

U.S. PATENT DOCUMENTS

| 5,499,281 | A | 3/1996 | Weedon et al. |
| 6,437,426 | B1 | 8/2002 | Yoshida |
| 6,624,536 | B1 | 9/2003 | Sawada et al. |
| 2004/0154815 | A1 | 8/2004 | Gustafsson et al. |
| 2005/0121616 | A1 * | 6/2005 | Petrick ................... 250/370.09 |

FOREIGN PATENT DOCUMENTS

EP         0603709 A2      6/1994

OTHER PUBLICATIONS

Antonuk et al: "Demonstration of Megavoltage and Diagnostic X-Ray Imaging With Hydrogenated Amorphous Silicon Arrays"; Medical Physics, AIP, Melville, NY, vol. 19, No. 6, pp. 1455-1465, XP000322357., date: 1996.

Chung, G.: "An Experiment of the Layout and Grounding of Power Distribution Wires in a Printed Circuit Board"; IEEE Transactions on Education, IEEE Service Center, Piscataway, NJ, vol. 44, No. 4, Nov. 2001, pp. 315-321, XP011015353.

* cited by examiner

*Primary Examiner*—David P Porta
*Assistant Examiner*—Kiho Kim

(57) ABSTRACT

In a flat X-ray detector, Electromagnetic Interference (EMI) is reduced by either opening a pickup loop between the common lines (28) and the reference plane (29) of the PCB, or by reducing the size of a pickup loop by providing a permanent connection (33) between the common supply line and the reference plane (29) in respect of each row of photoconductors (12).

12 Claims, 3 Drawing Sheets

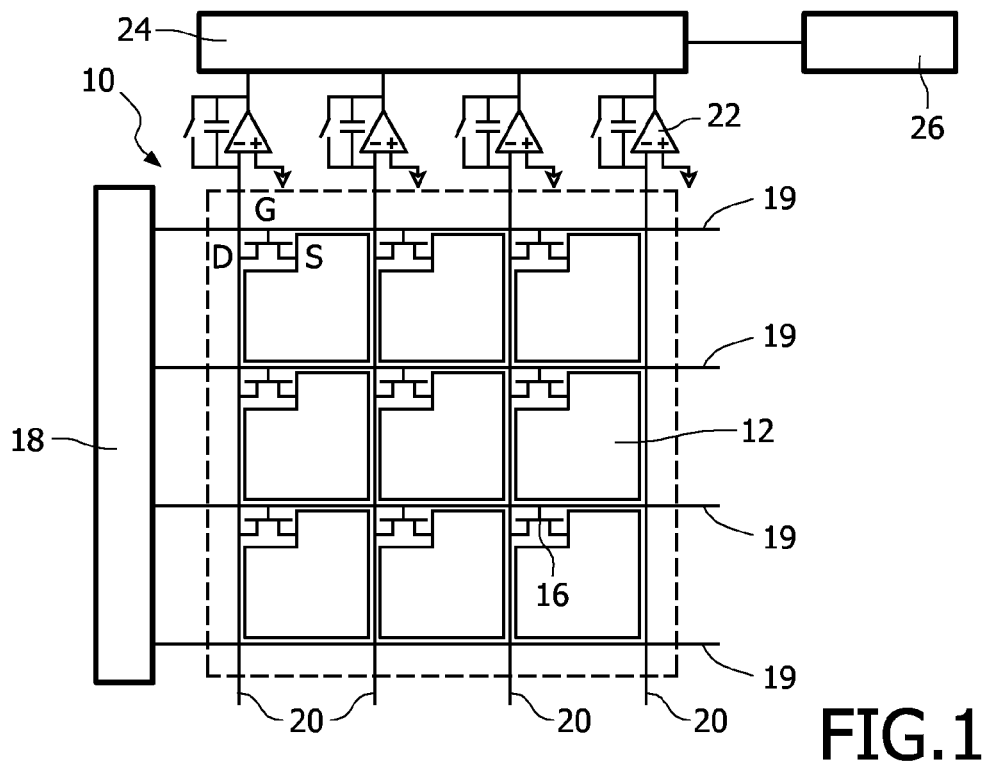
FIG.1
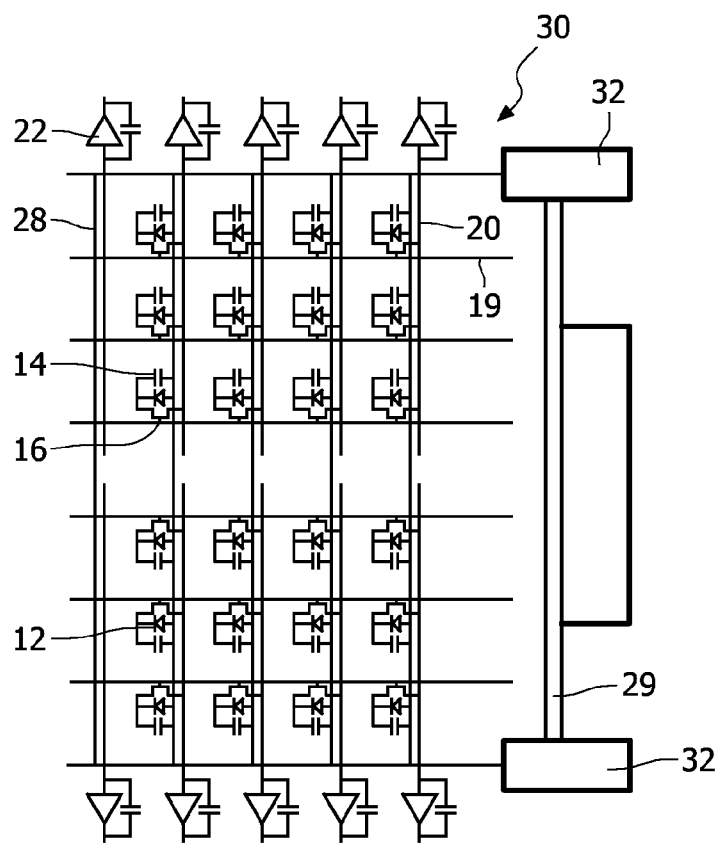 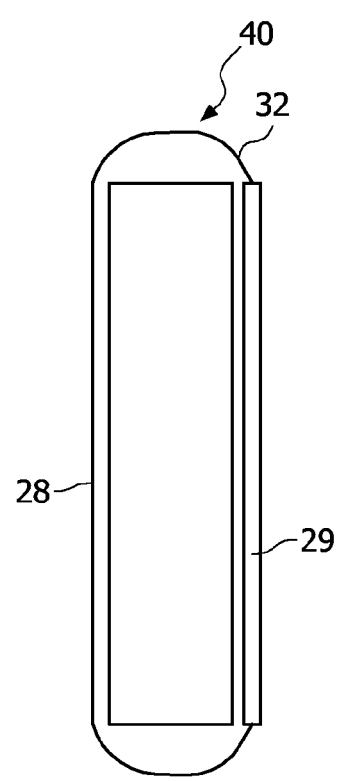
FIG.2a   FIG.2b

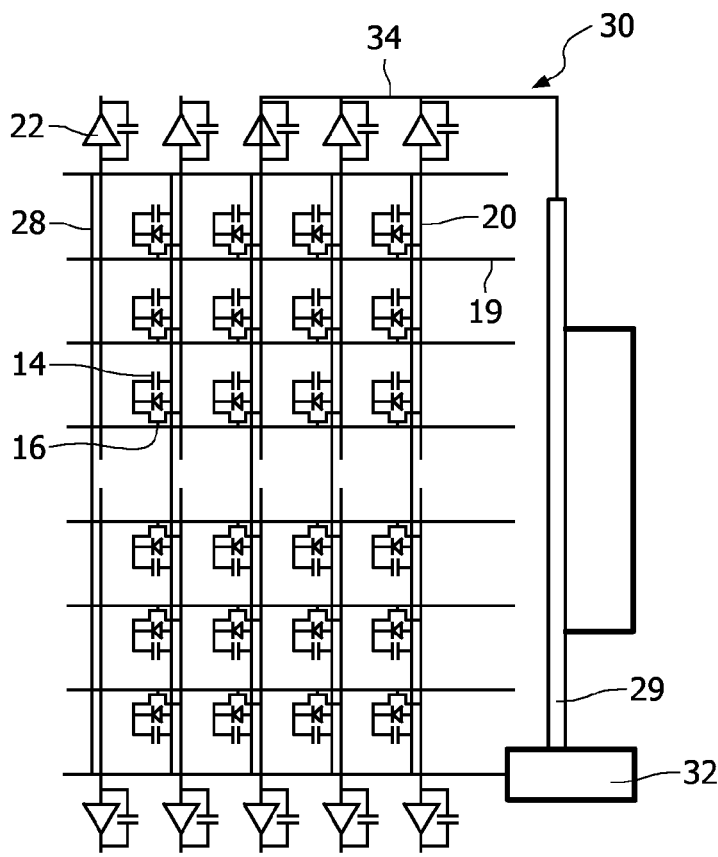 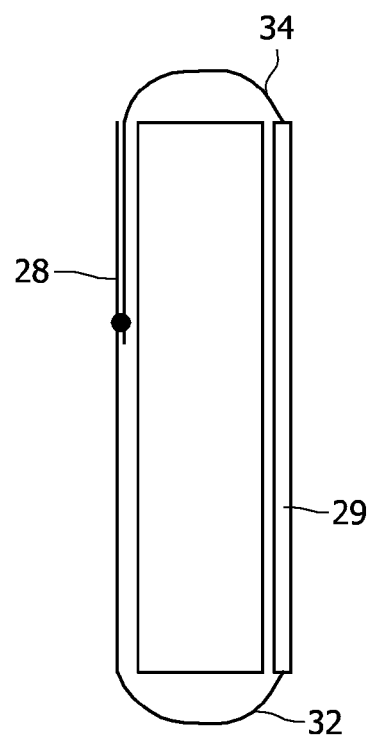
FIG. 3a  FIG. 3b
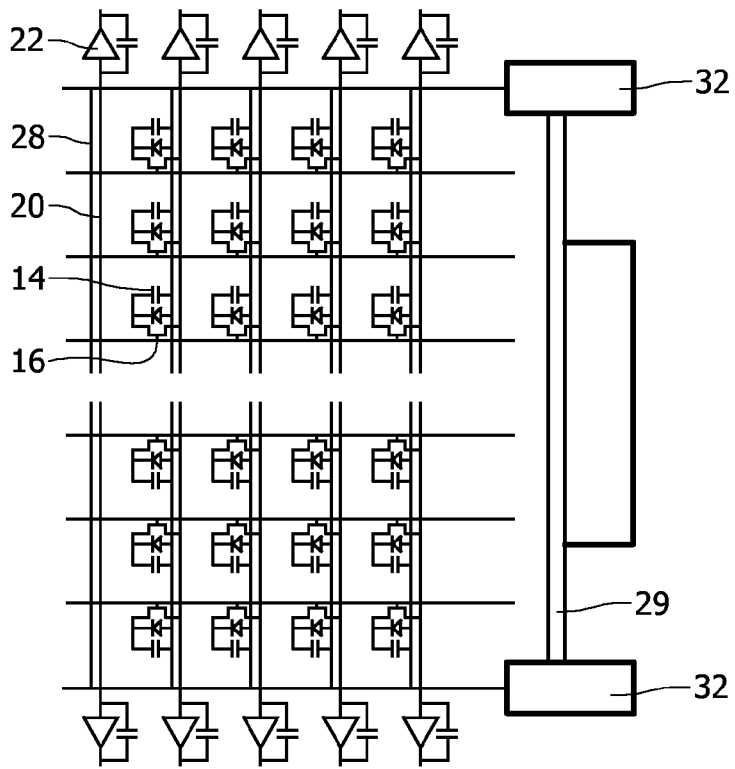
FIG. 4

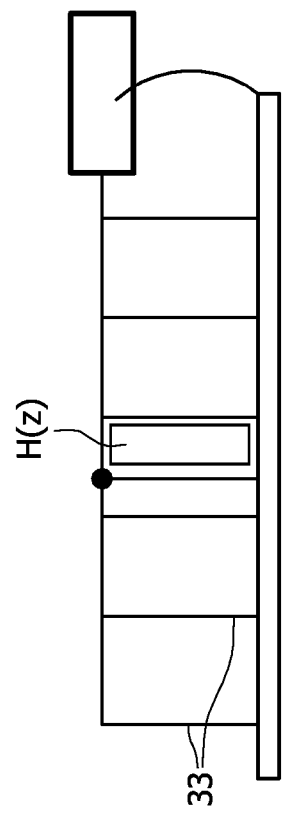
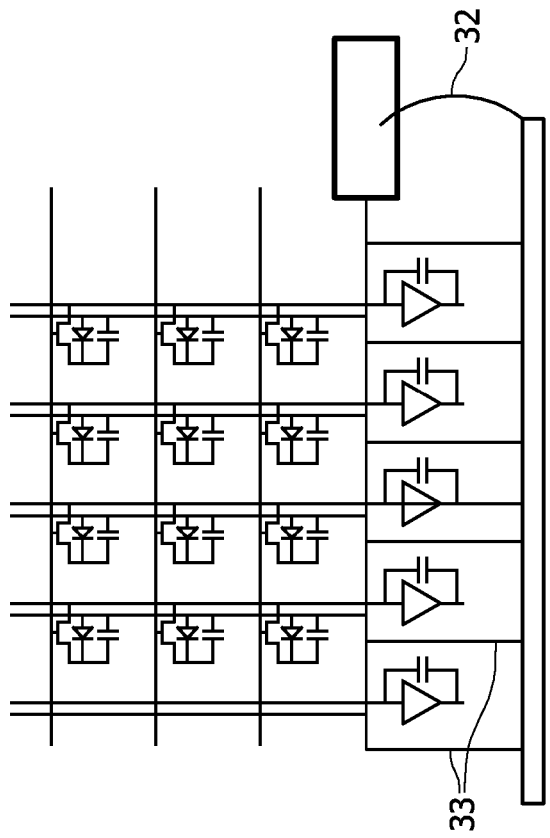
FIG. 6a
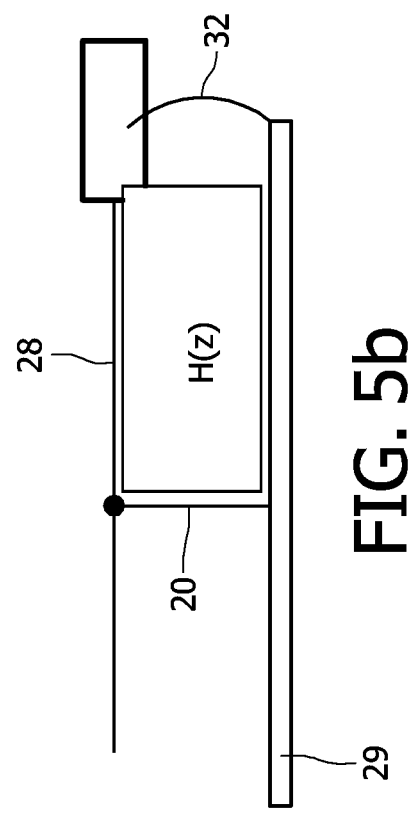
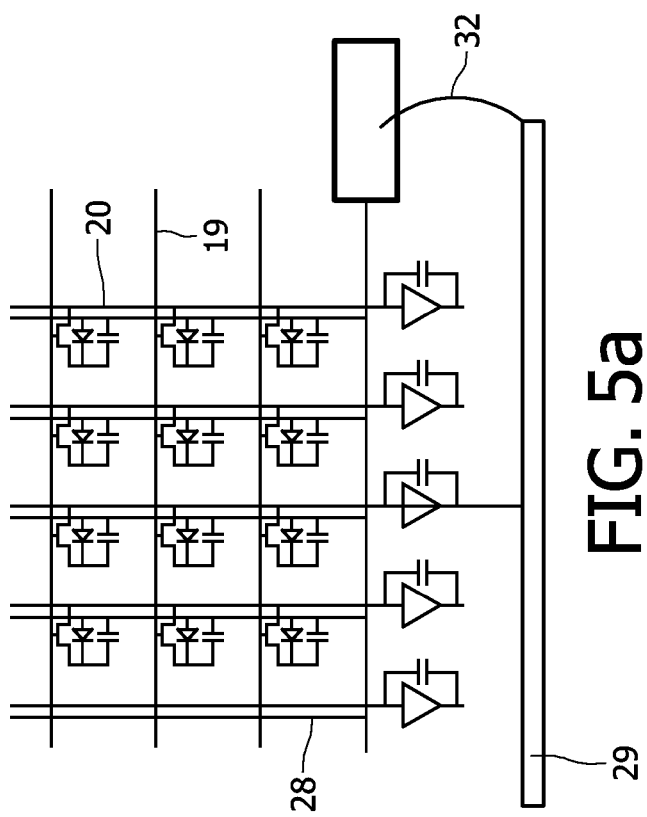
FIG. 5a
FIG. 6b
FIG. 5b

DIGITAL FLAT X-RAY DETECTOR

This invention relates generally to an X-ray detector and, more particularly, to an X-ray detector having a configuration intended to reduce induced noise which would otherwise impair the operational efficiency of the components thereof.

Sensitive electronic components, especially when used in large matrix-like configurations, as well as integrated circuits, are susceptible to Electromagnetic Interference. The induction of electromagnetic signals within a circuit often interferes with the operation and performance of sensitive electronic components as well as reducing the reliability thereof. An EMI source emission can be a conducted voltage or current coupling via conducted paths through which current can flow, or an electric or magnetic field coupling through space or materials by means of electromagnetic wave propagation.

Similarly, alternating magnetic fields can pose a significant problem to the operational efficiency of instruments composed of semiconductors in a large matrix-like structure, such as that of a flat X-ray detector. A typical detector comprises a scintillation layer for converting X-ray photons into visible light photons, and photoconductors for converting the visible light photons into extremely low-amplitude electrical currents representative of the X-ray flux incident on a detector. The extremely low amplitude currents are transmitted via an array of respective conductors to a data acquisition system (DAS) for signal processing.

Amorphous Silicon (aSi) is a highly developed photoconductor used for X-ray applications. Its amorphous state maintains uniform characteristics to very fine levels over large areas. A large area detector is essential in radiography since no means are provided to focus the X-rays, thereby necessitating a shadow X-ray image, which is larger than the body part to be imaged. The requirement for such large screens, and hence more complex circuits, incurs a penalty in terms of image quality due to the effects of alternating magnetic fields across the large area active matrix array.

Due to electromagnetic induction, these alternating magnetic fields induce, in accordance with Faradays law, an emf and therefore a current over a closed loop in the detector circuit. The above-mentioned extremely low amplitude currents representative of the X-ray flux incident on the detector are vulnerable to interference when exposed to this induced source of low-level electrical noise.

Arrangements are known in which reducing the disturbances induced by magnetic pickup has focused on actively shielding the detector. U.S. Pat. No. 5,499,281 describes an apparatus for shielding and grounding an X-ray detector assembly. The proposed configuration includes an electrically conductive enclosure that substantially encloses the detector assembly and connects to the ground plane of the data acquisition system (DAS), independently of the signal and return paths between the detector assembly and the DAS.

Similarly, US Patent Application Publication No. 2004/0154815A1 describes a shielding arrangement comprising a 'shielding can' and a layered PCB having electrical components and at least two ground potential layers. There are grounding connections between the edges of the shielding can and at least one of the ground potential layers, and grounding connections between components inside the shielding can and at least one of the ground potential layers so that the two grounding connections are connected to each other only through at least one of the ground potential layers for providing small pickup loops. In the case of separating grounds of the shield and circuits, the ground layer of the 'shielding can' provides a part of a Faraday cage, which protects the electrical circuits on the printed circuit boards from electromagnetic interference.

However, both of these known arrangements suffer from the drawback that they require the incorporation of shielding around the detector. Shielding does reduce the susceptibility of an X-ray detector to alternating magnetic fields, but it also tends to shield the detector from the X-rays it is intended to detect, thereby reducing the effectiveness of operation of the detector. Thus, it is an object of the invention to provide a method of reducing electromagnetic disturbances within a detector without the need for active shielding of the detectors which may otherwise reduce the sensitivity of the detector to incident X-rays.

In accordance with a first aspect of the present invention, there is provided an X-ray detector comprising at least one photoconductor for generating charge dependent on the intensity of X-rays incident on said detector, and at least one supply line for providing an input to said at least one photoconductor, said supply line being connected at one end to a reference and no electrical connection being provided at the other end of said at least one supply line.

Thus, because the (and preferably each of plurality of) supply lines form an open comb structure in the circuit, as opposed to a mesh structure with closed loops in which a current caused by electromagnetic induction may be induced, the occurrence of EMI is reduced accordingly.

In accordance with a second aspect of the present invention, there is provided an X-ray detector comprising a plurality of rows of photoconductors comprising two end rows and a plurality of intermediate rows, each row comprising at least one photoconductor, each row having associated therewith a readout line for carrying a charge signal dependent on the intensity of X-rays incident on said detector, and a common line connected to a common supply line, a permanent connection being provided between said common supply line and a common reference plane in respect of an end row and at least one intermediate row.

Thus, in this case, the above-mentioned object is achieved by reducing a lateral pickup loop area relative to the prior art arrangement.

The detector of the first aspect of the present invention preferably comprises a plurality of rows, each row comprising at least one photoconductor, each row having a supply line for providing an input to the or each photoconductor in the row, each supply line being connected at one end to a common reference plane, no electrical connection being provided at the other end of each supply line so as to define a substantially comb-like structure. Beneficially, the detector comprises an upper set of rows and a lower set of rows, each set of rows defining an electrically separate conducting comb-like structure at a respective upper and lower sector of said detector. Beneficially, each row comprises a plurality of photoconductors in a read-out line for carrying a charge signal dependent on the intensity of X-rays incident on the detector. Each read-out line is preferably connected to a charge amplifier to amplify a generated signal before read-out. Each supply line is beneficially connected by a common supply line to the reference. In one exemplary embodiment, a permanent connection may be provided between the common supply line and the reference in respect of a plurality of the rows. The permanent connection may be provided between the common supply line and the reference in respect of a plurality of adjacent rows. Of course, it will be appreciated that the arrangement would still work (possibly less efficiently) if, instead of providing the permanent connection in respect of the adjacent rows, every other or every third row were to be provided with the connection, and the present invention is not necessarily intended to be limited in this regard.

In respect of the second aspect of the present invention, again, each row preferably comprises a plurality of photoconductors connected to a common line, and each read-out line is preferably connected to a charge amplifier. A permanent connection is preferably provided between the common supply line and the common reference plane in respect of each intermediate row.

Embodiments of the present will now be described, by way of examples only and with reference to the accompanying drawings, in which:

FIG. 1 is a partial schematic diagram illustrating the configuration of a flat X-ray detector array according to the prior art;

FIG. 2a is a schematic plan view of another flat X-ray detector array, according to the prior art;

FIG. 2b is a schematic side view of the flat X-ray detector array of FIG. 2a, showing the pickup loop defined between the common flex foils;

FIG. 3a is a schematic plan view of the flat X-ray detector array of FIG. 2a, with one of the common flex foils omitted;

FIG. 3b is a schematic side view of the flat X-ray detector array of FIG. 3a showing the pickup loop defined between the remaining common flex foil and the read-out flex foil;

FIG. 4 is a schematic plan view of a flat X-ray detector array according to an exemplary embodiment of the first aspect of the present invention;

FIG. 5a is a schematic plan view of the X-ray detector of FIG. 2a, showing a second lateral pickup loop between the common connections to the array and the read-out lines:

FIG. 5b is a schematic side view of the X-ray detector of FIG. 5a, showing the same pickup loop;

FIG. 6a is a schematic plan view of a flat X-ray detector according to a second exemplary embodiment of the present invention; and FIG. 6b is a schematic side view of the detection of FIG. 6a.

Referring to FIG. 1 of the drawings, a typical flat X-ray detector array in the form of an active matrix 10 comprises a plurality of pixels, each comprising a photoconductor with storage capacitor 12 and thin-film transistor (TFT) 16. An external scanning control circuit (18) turns on the TFTs 16 via a plurality of gates lines 19, for transferring the image charge from the pixels to a plurality of readout lines 20, and then to respective external charge amplifiers 22. At the same time, the input (virtual ground) of the charge amplifiers 22 resets the potential of each photoconductor 12. The resulting amplified signal for each row is multiplexed by a parallel-to-serial converter or multiplexer 24, and then transmitted to an analogue-to-digital converter or digitiser 26.

Each TFT 16 comprises three electrical connections: the source (S) is connected to a photoconductor with storage capacitor 12; the drain (D) is connected to a readout line 20 shared by all TFTs of the same divisional column, and also to an external charge amplifier 22; and the gate (G) is used for control of the 'on' and 'off' state of the TFT 16. In a typical arrangement 10V and −5V may be applied to respectively turn the TFT 16 on and off.

The scanning control circuit 18 may be fabricated as a single crystal silicon integrated circuit, wire bonded to the active matrix TFT array. The charge amplifiers 22 and multiplexer 24 may also be fabricated as a single crystal silicon integrated circuit, wire bonded to the active matrix array.

Referring to FIG. 2a, there is shown a plan view of another known X-ray detector 30 which is arranged and configured in a similar manner to that of FIG. 1, and like reference numerals are used to denote corresponding elements, however in this case a common line 28 is provided that runs both horizontally, at the top and bottom extremity of the array in between the charge amplifiers 22, as well as unabridged vertically from said horizontal common lines in equal number to, and in parallel close proximity to the readout lines 20. Typically, the common lines 28 are connected to a reverse voltage of say −8V. The higher the reverse voltage, the more charge fits on the pixel storage capacitor 14, i.e. the more X-ray exposure is permitted. Also shown is a ground plane 29 of a printed circuit board. The pick up loop for alternating magnetic currents entering the detector laterally is indicated on the diagram with a bold connection path. The loop is created by a combination of the common lines 28 the common flex foils 32 and the ground plane 29 of the PCB as shown in FIG. 2b which provides a side view of the array, whereby the same pickup loop can be seen, as well as an indication of the enclosed magnetic field intensity H(z).

Referring to FIGS. 3a and 3b, one way to open the above-mentioned pick-up loop might be to remove one of the flex foils 32. However, as shown, even with one of the common flex foils 32 disconnected, a pickup loop almost identical to that shown in FIGS. 2a and 2b is created by a combination of the common lines 28 the remaining common flex foil 32 the readout flex foil 34 and the ground plane 29 of the PCB. This is due to the fact that when a readout line is selected the photodiode and its capacitor become part of the loop. In FIG. 3b, which illustrates a side view of the loop, the magnetic intensity H(z) generated within the pickup loop is also indicated.

Thus, in accordance with an exemplary embodiment of the first aspect of the present invention, the pickup loop is eliminated by opening the common lines 28 along the horizontal centreline of the array, as illustrated in FIG. 4. This maintains the functionality of the detector without the occurrence of a closed loop either by a combination of the common lines 28 the common flex foils 32 and the ground plane 29 of the PCB, or during readout by a combination of the common lines 28 the common flex foil 32 the readout flex foil 34 and the ground plane 29 of the PCB. The loop is opened at the same location in both cases.

Referring to FIGS. 5a and 5b of the drawings, another lateral pickup loop in a known detector is evident, which pickup loop is substantially perpendicular to that illustrated in FIGS. 2 and 2b. This loop is created by a combination of the common connections 28 to the array, the common flex foils 32, the readout lines 20 and the ground plane 29 of the PCB. A second exemplary embodiment of the present invention makes use of the fact that another way of reducing disturbances in the circuit is to make the area of the pickup loop smaller, because in this case the loop cannot be opened without adversely affecting the function of the circuit. Thus, in this case, EMI disturbance is minimised, referring to FIGS. 6a and 6b of the drawings, by introducing a plurality of hard wired connections 33, with at least one being provided between each readout amplifier 22, connecting the horizontal component of the common line 28 to the ground plane 29 of the PCB. This ensures that, during readout operation the pickup loop is drastically reduced in size for most cases and as such the level of associated disturbance (dependent on $H_{(z)}$) is also reduced.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An X-ray detector comprising at least one photoconductor (12) for generating charge dependent on the intensity of X-rays incident on said detector, and at least one supply line (28) for providing an input to said at least one photoconductor (12), said supply line (28) being connected at one end to a reference (29) and no electrical connection being provided at the other end of said at least one supply line (28).

2. A detector according to claim 1, comprising a plurality of rows, each row comprising at least one photoconductor (12) each row having a supply line (28) for providing an input to the or each photoconductor (12) in said row, each supply line (28) being connected at one end to a common reference plane (29), no electrical connection being provided at the other end of each supply line (28) so as to define a comb-like structure.

3. A detector according to claim 2, comprising an upper set of rows and a lower set of rows, each set of rows defining an electrically separate conducting comb-like structure at a respective upper and lower sector of said detector.

4. A detector according to claim 2, wherein each row comprises a plurality of photoconductors (12) and a read-out line (20) for carrying a charge signal dependent on the intensity of X-rays incident on said detector.

5. A detector according to claim 4, wherein each read-out line (20) is connected to a charge amplifier.

6. A detector according to claim 2, wherein each supply line (28) is connected via a common supply line (32) to said reference (29).

7. A detector according to claim 6, wherein a permanent connection (33) is provided between the common supply line (32) and said reference (29) in respect of a plurality of said rows.

8. A detector according to claim 7, wherein a permanent connection (33) is provided between the common supply line (32) and said reference (29) in respect of a plurality of adjacent rows.

9. An X-ray detector comprising a plurality of rows of photoconductors (12) comprising two end rows and a plurality of intermediate rows, each row comprising at least one photoconductor (12), each row having associated therewith a readout line (20) for carrying a charge signal dependent on the intensity of X-rays incident on said detector, and a common line (28) connected to a common supply line, a permanent connection being provided between said common supply line and a common reference plane (29) in respect of an end row and at least one intermediate row.

10. A detector according to claim 9, wherein each said row comprises a plurality of photoconductors (12), connected to a common line (28).

11. A detector according to claim 10, wherein each read-out line (20) is connected to a charge amplifier (22).

12. A detector according to claim 9, wherein a permanent connection (33) is provided between said common supply line (32) and said common reference plane (29) in respect of each intermediate row.

* * * * *